United States Patent
Kim et al.

(10) Patent No.: US 11,737,072 B2
(45) Date of Patent: Aug. 22, 2023

(54) METHOD FOR DETERMINING TRANSMISSION BEAM IN WIRELESS COMMUNICATION SYSTEM SUPPORTING SIDELINK, AND TERMINAL THEREFOR

(71) Applicant: LG ELECTRONICS INC., Seoul (KR)

(72) Inventors: Heejin Kim, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/965,148

(22) PCT Filed: Mar. 20, 2019

(86) PCT No.: PCT/KR2019/003219
§ 371 (c)(1),
(2) Date: Jul. 27, 2020

(87) PCT Pub. No.: WO2019/182341
PCT Pub. Date: Sep. 26, 2019

(65) Prior Publication Data
US 2021/0045103 A1 Feb. 11, 2021

(30) Foreign Application Priority Data
Mar. 20, 2018 (KR) ........................ 10-2018-0031860

(51) Int. Cl.
*H04W 72/044* (2023.01)
*H04W 72/0446* (2023.01)

(52) U.S. Cl.
CPC ..... *H04W 72/046* (2013.01); *H04W 72/0446* (2013.01)

(58) Field of Classification Search
CPC .................. H04W 72/046; H04W 72/0446
See application file for complete search history.

(56) References Cited

U.S. PATENT DOCUMENTS

| 8,208,392 | B2 | 6/2012 | Singh et al. |
| 2014/0269532 | A1* | 9/2014 | Huang .............. H04W 74/0833 370/329 |

(Continued)

FOREIGN PATENT DOCUMENTS

| KR | 101525978 | 6/2015 |
| WO | 2017123079 | 7/2017 |

(Continued)

OTHER PUBLICATIONS

PCT International Application No. PCT/KR2019/003219, Written Opinion of the International Searching Authority dated Jul. 12, 2019, 18 pages.

(Continued)

*Primary Examiner* — Jasper Kwoh
(74) *Attorney, Agent, or Firm* — Lee Hong Degerman Kang Waimey

(57) ABSTRACT

Disclosed is a method for a first terminal determining a transmission beam in a wireless communication system supporting a sidelink. Specifically, the method may comprise: receiving beam-associated information from a second terminal; and on the basis of the beam-associated information, determining a transmission beam for the second terminal. Particularly, the beam-associated information may include: a beam index; and a time resource index for the beam index. The UE is capable of communicating with at least one of another UE, a UE related to an autonomous driving vehicle, a base station or a network.

14 Claims, 24 Drawing Sheets

(56) References Cited

U.S. PATENT DOCUMENTS

| | | | |
|---|---|---|---|
| 2015/0289147 A1 | 10/2015 | Lou et al. | |
| 2018/0269947 A1* | 9/2018 | Levitsky | H04B 7/0626 |
| 2018/0331747 A1* | 11/2018 | Kakishima | H04B 7/0626 |
| 2019/0028170 A1* | 1/2019 | Zhang | H04B 7/0619 |
| 2019/0253122 A1* | 8/2019 | Yang | H04B 7/06 |
| 2019/0253867 A1* | 8/2019 | Abedini | H04B 7/088 |
| 2019/0260461 A1* | 8/2019 | Kim | H04W 72/085 |
| 2020/0120682 A1* | 4/2020 | Li | H04L 5/00 |
| 2020/0235885 A1* | 7/2020 | Su | H04W 72/0446 |
| 2020/0287677 A1* | 9/2020 | Kakishima | H04W 72/046 |
| 2021/0204265 A1* | 7/2021 | Hakola | H04W 36/0055 |

FOREIGN PATENT DOCUMENTS

| | | |
|---|---|---|
| WO | 2017164846 | 9/2017 |
| WO | 2017196124 | 11/2017 |

OTHER PUBLICATIONS

MediaTek Inc., "Beam sweeping and impacts to mobility," 3GPP TSG-RAN WG2 #95bis, R2-166104, Oct. 2016, 7 pages.
European Patent Office Application Serial No. 19771946.1, Search Report dated Nov. 10, 2021, 8 pages.

* cited by examiner

FIG. 5
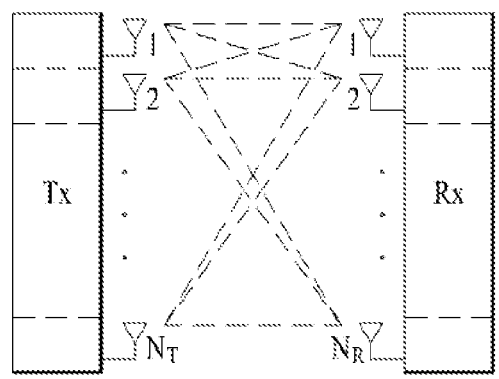
(a)
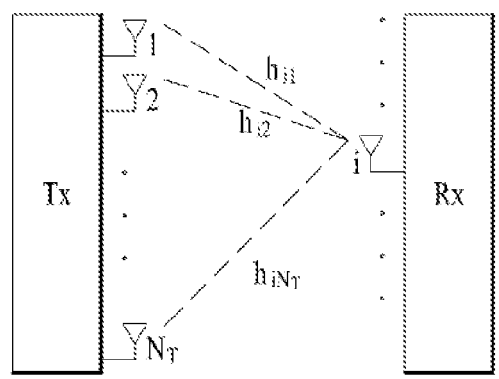
(b)

FIG. 8
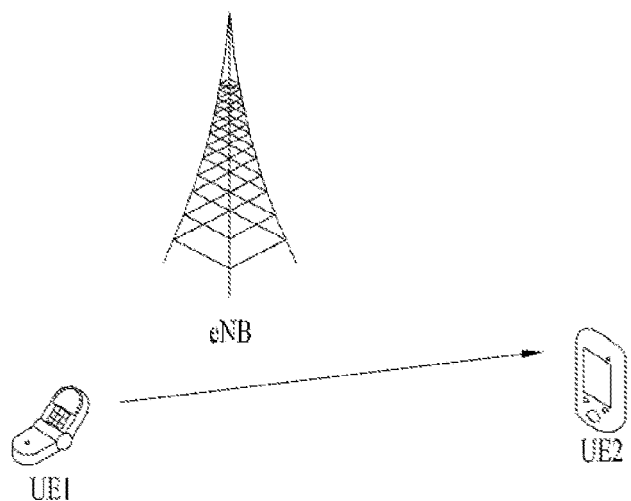
(a)
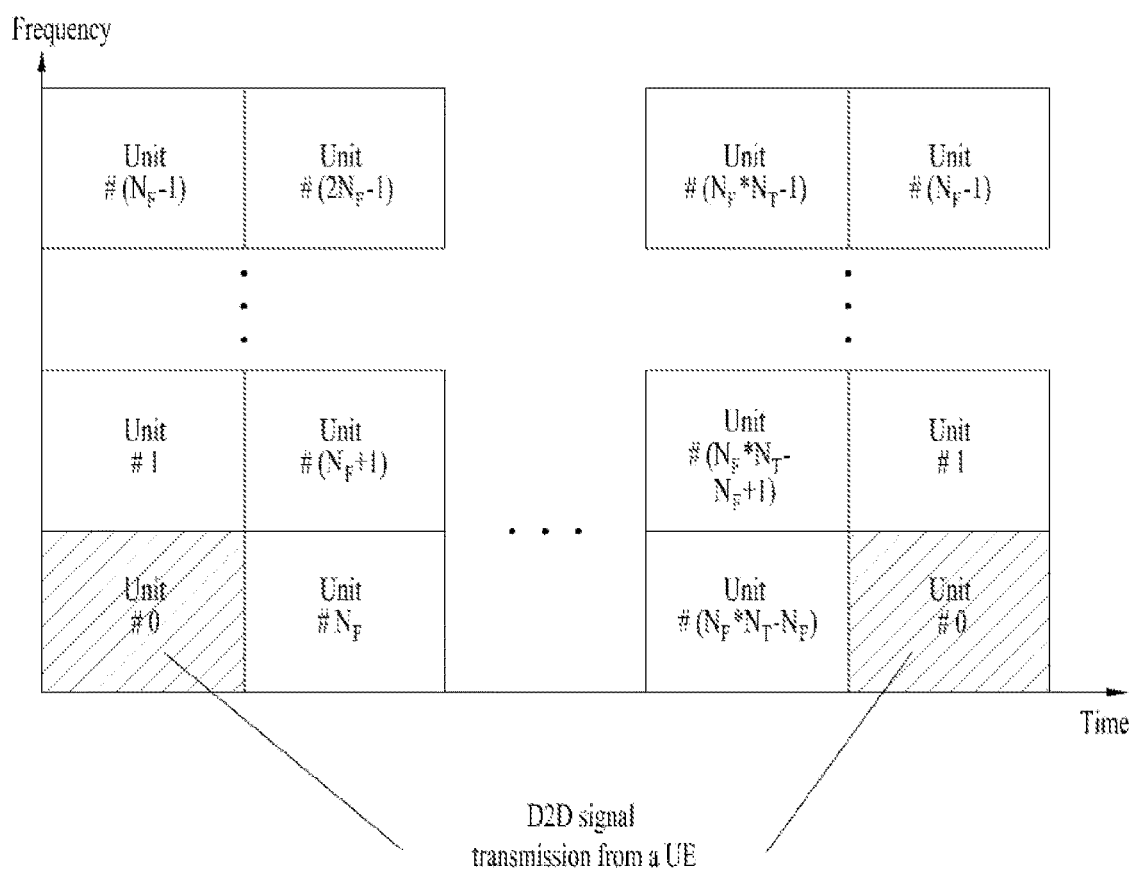
(b)

FIG. 9
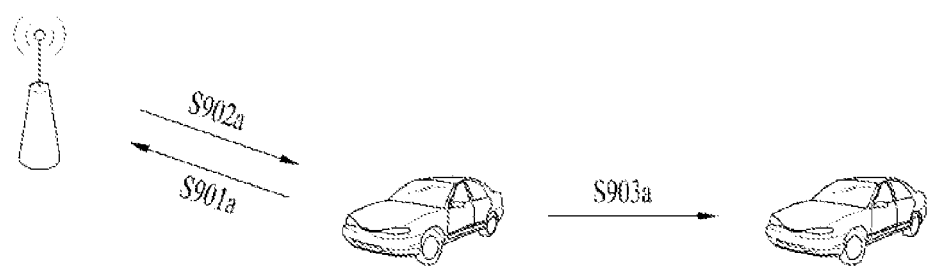
(a)
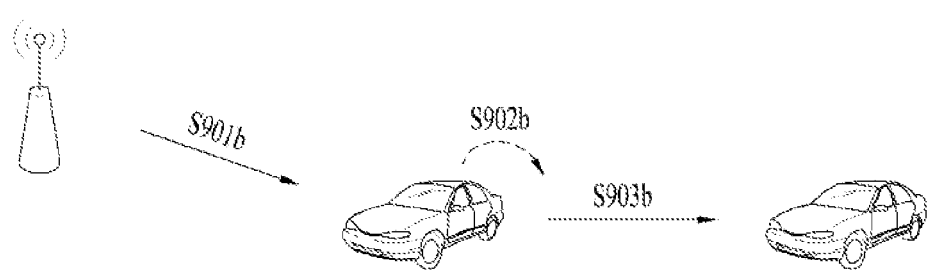
(b)

FIG. 12
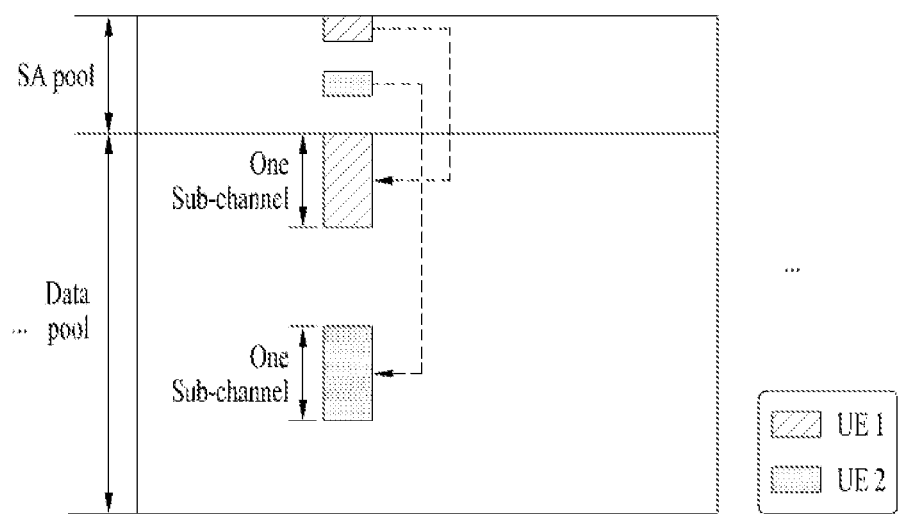
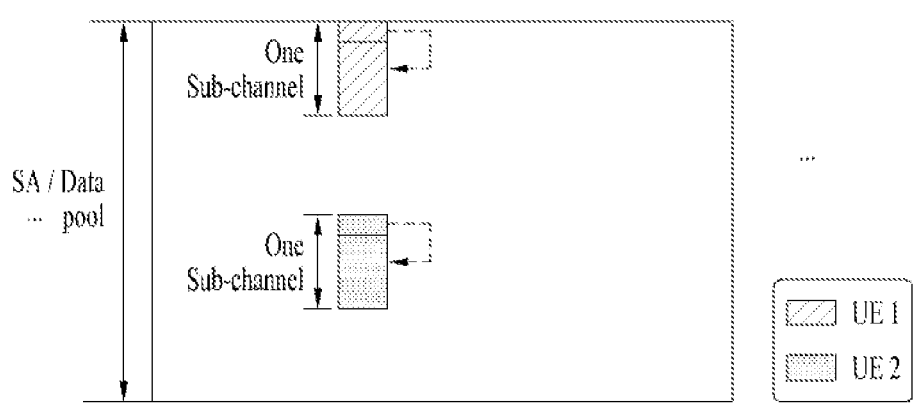

FIG. 14
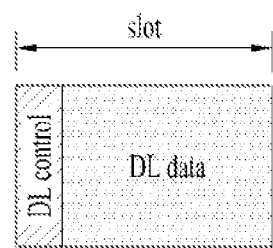
Type A
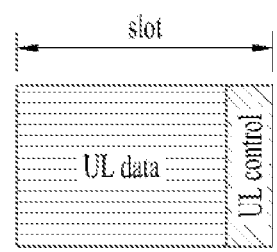
Type B
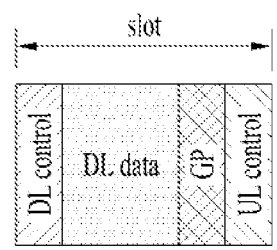
Type C
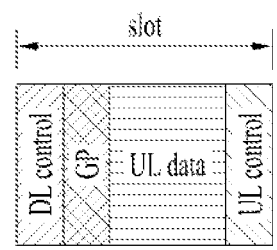
Type D

METHOD FOR DETERMINING TRANSMISSION BEAM IN WIRELESS COMMUNICATION SYSTEM SUPPORTING SIDELINK, AND TERMINAL THEREFOR

CROSS-REFERENCE TO RELATED APPLICATIONS

This application is the National Stage filing under 35 U.S.C. 371 of International Application No. PCT/KR2019/003219, filed on Mar. 20, 2019, which claims the benefit of earlier filing date and right of priority to Korean Application No. 10-2018-0031860, filed on Mar. 20, 2018, the contents of which are all incorporated by reference herein in their entirety.

TECHNICAL FIELD

The present disclosure relates to a method of determining a transmission beam in a wireless communication system supporting sidelink and terminal therefor, and more particularly, to a method of determining a pair of transmission and reception beams for direct communication between terminals.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method for a terminal to determine a transmission beam in a wireless communication system supporting sidelink. Specifically, the object of the present disclosure is to provide a method of determining a pair of transmission and reception beams for direct communication between terminals.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of determining a transmission beam by a first user equipment (UE) in a wireless communication system supporting sidelink. The method may include receiving beam-related information from a second UE and determining a transmission beam for the second UE based on the beam-related information. The beam-related information may include a beam index and a time resource index for the beam index.

The determination of the transmission beam for the second UE may include determining a transmission beam and a transmission time resource based on the beam index and the time resource index.

The beam index may be the beam index of a reception beam of the second UE.

The method may further include transmitting a reference signal on each of a plurality of reference signal resources. The beam-related information may be received from the second UE in response to the transmission of the reference signal, and the beam index may indicate one of the plurality of reference signal resources.

The time resource index may be included within a predetermined valid time period.

The beam-related information may further include a reference signal received power (RSRP) or a signal-to-noise ratio (SNR) measured by the second UE based on the reception beam with the beam index.

The beam-related information may be received from the second UE in response to beam sweeping of the first UE.

The reception of the beam-related information from the second UE may include receiving beam-related information from each of a plurality of second UEs. The determination of the transmission beam may include determining the direction, width, and transmission time resource of a transmission beam for each of the plurality of second UEs.

The method may further include grouping the plurality of second UEs into a plurality of groups based on the beam-related information received from each of the plurality of second UEs. Signals for the plurality of groups may be transmitted on different transmission time resources.

Advantageous Effects

According to an embodiment or implementation of the present disclosure, a transmission and reception beam pair and timing may be adjusted by efficient signaling between transmitting and receiving UEs in millimeter wave (mmWave) bands, thereby improving communication quality and reducing communication delay.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas;

FIG. 8 is a view illustrating an exemplary D2D resource pool for D2D communication;

FIG. 9 is a view referred to for describing transmission modes and scheduling schemes for vehicle-to-everything (V2X);

FIG. 12 is a view referred to for describing an SA and data transmission in V2X;

FIGS. 13 and 14 are views illustrating a new radio access technology (new RAT or NR) frame structure;

BEST MODE

Figure 1:
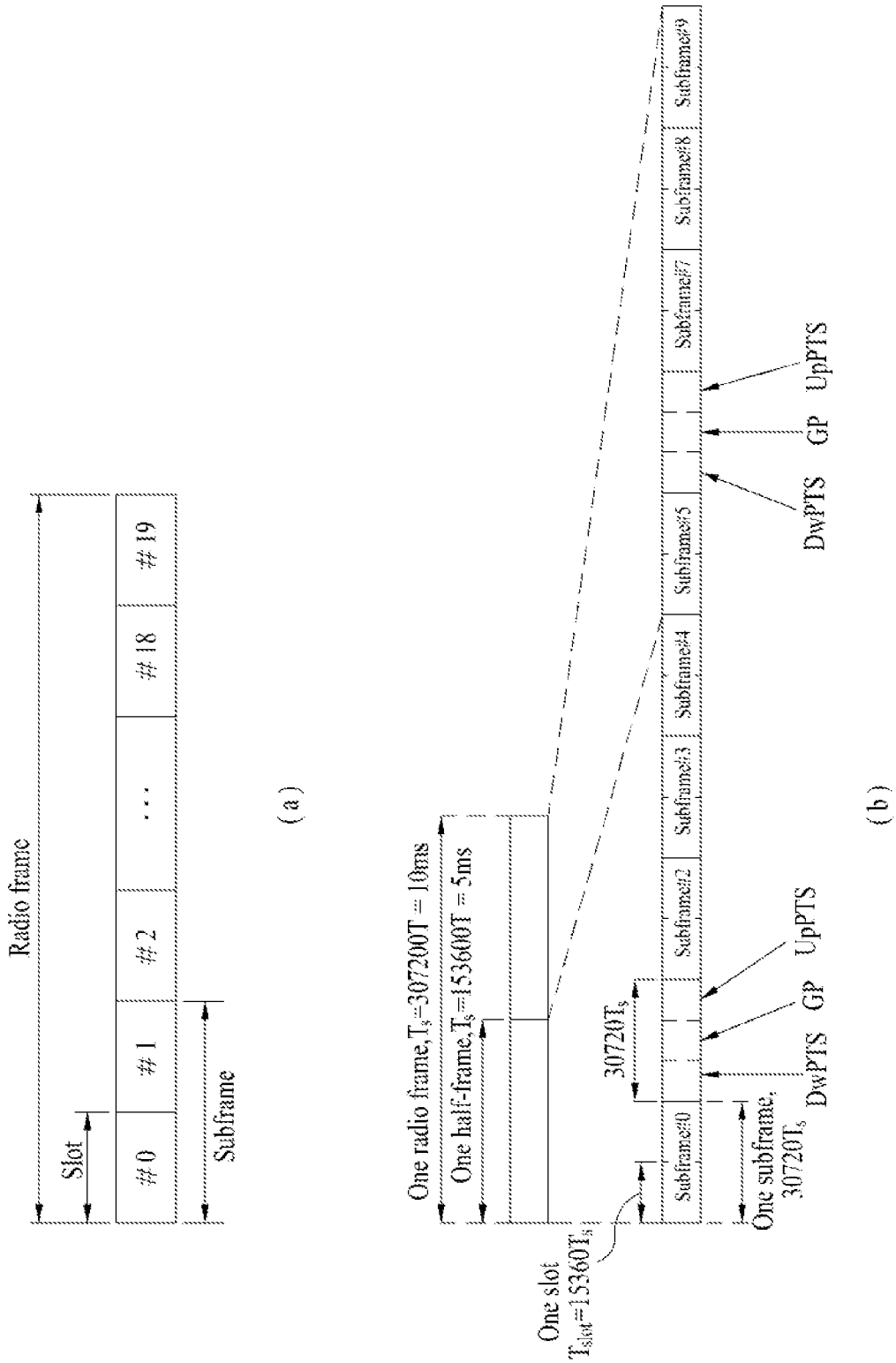
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MS S)', 'subscriber station (SS)', etc. The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
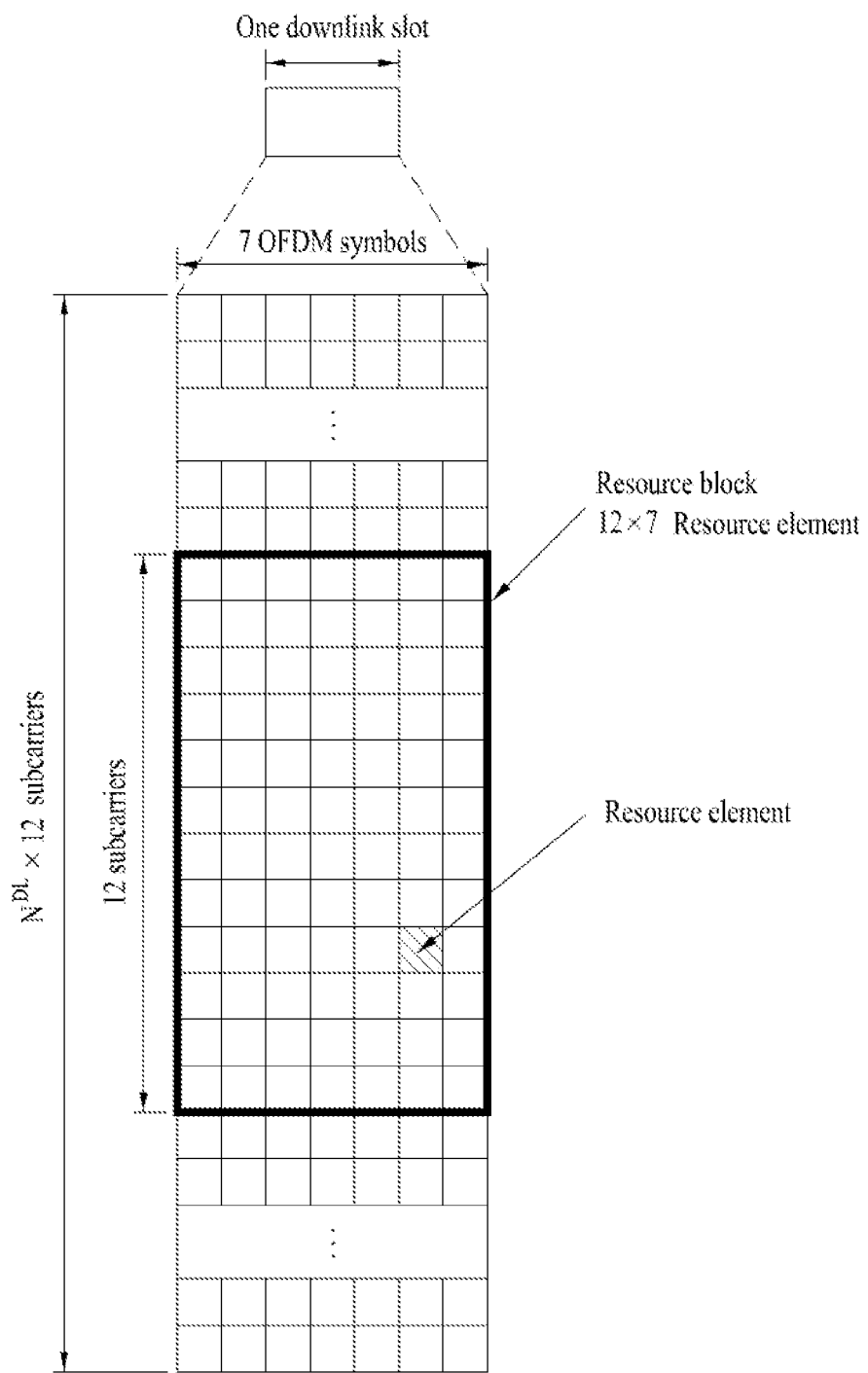
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
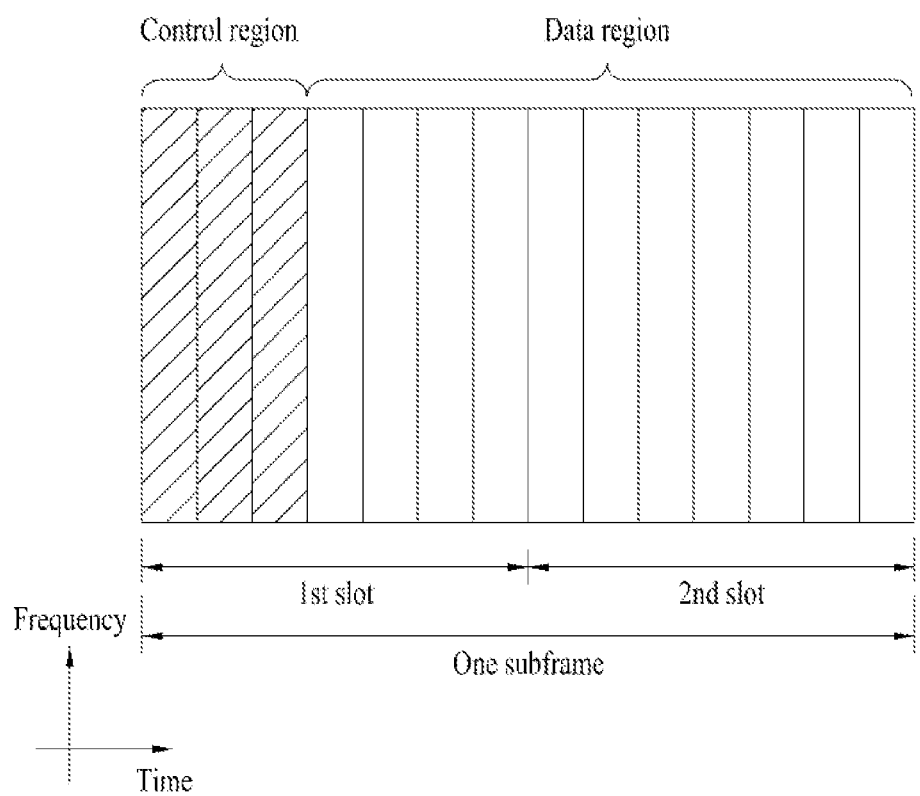
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
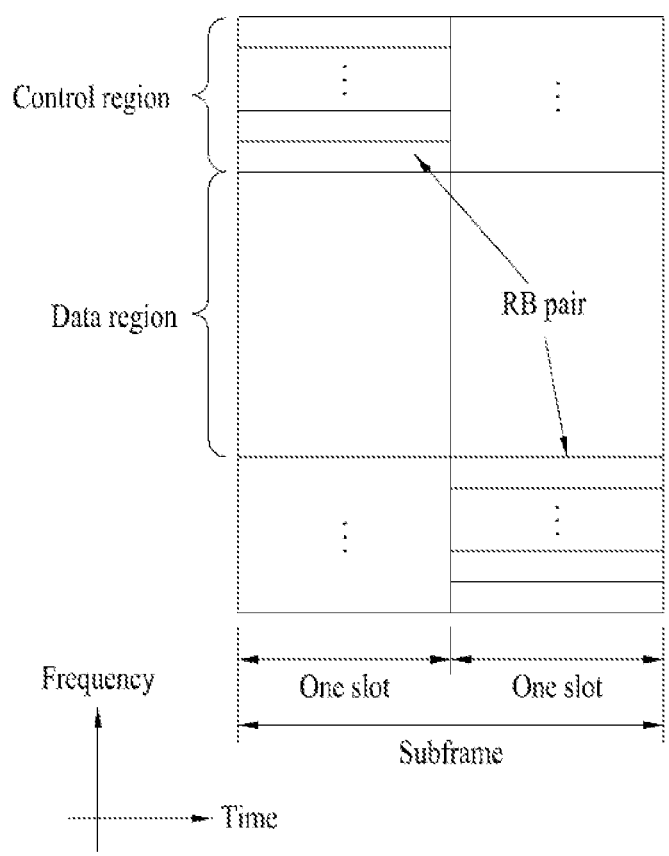
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained.

In order to explain a communicating method in a MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \qquad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix}$$

[Equation 8]

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
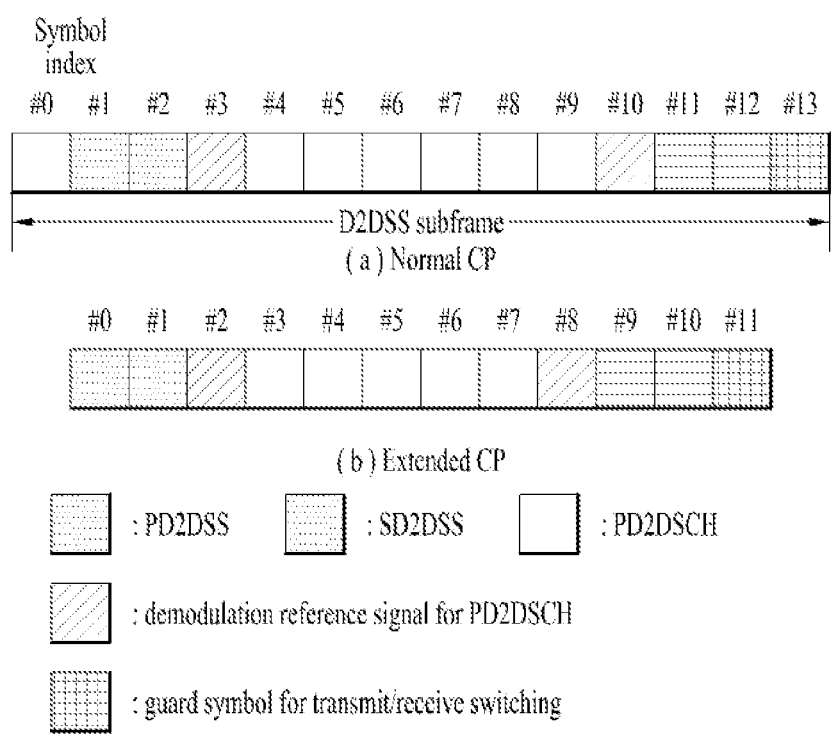
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
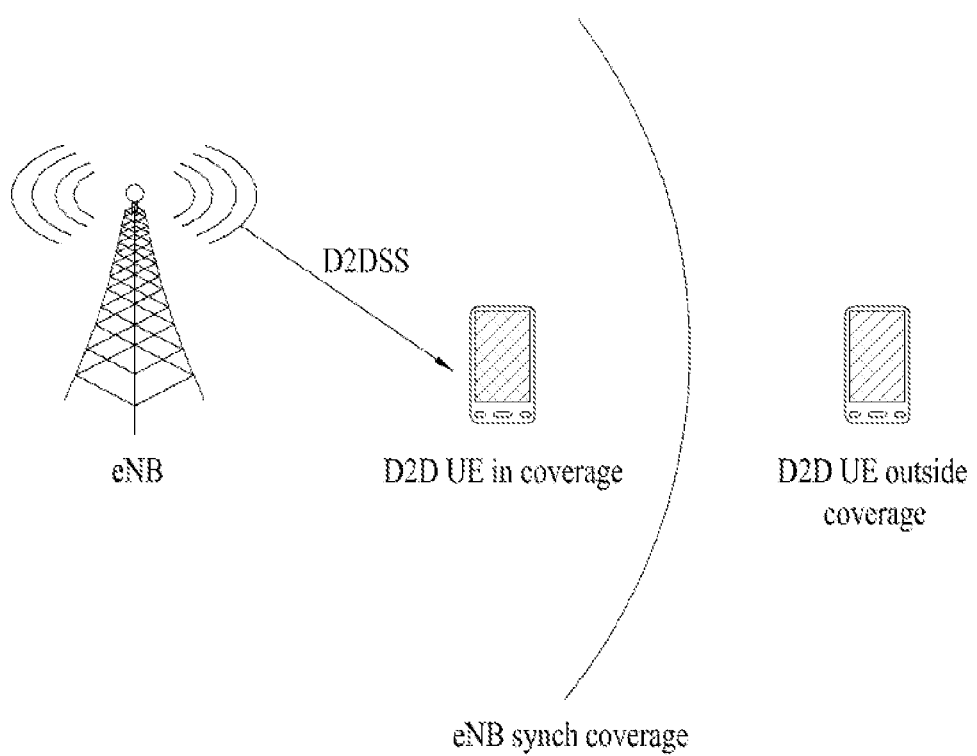
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

In V2X, sidelink transmission mode 3 based on centralized scheduling and sidelink transmission mode 4 based on distributed scheduling are available. FIG. 9 illustrates scheduling schemes according to these two transmission modes.

Figure 10:
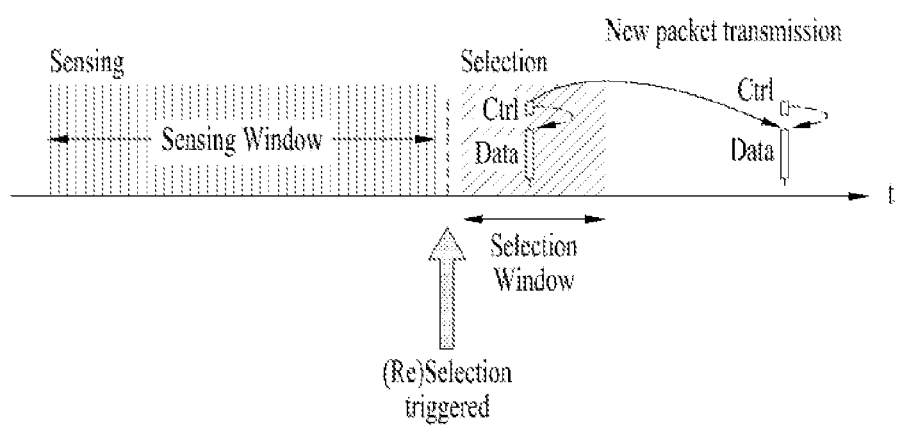
FIG. 10 is a view illustrating a method of selecting resources in V2X.
Figure 11:
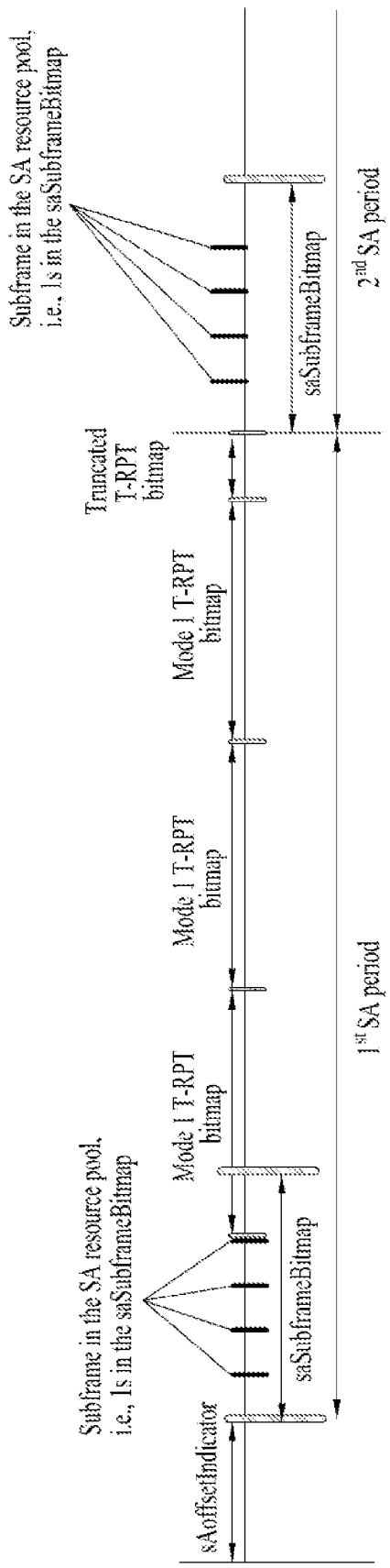
FIG. 11 is a view referred to for describing a scheduling assignment (SA) and data transmission in D2D.

Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to 1s in a T-RPT bitmap, and one MAC PDU is transmitted four times.

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
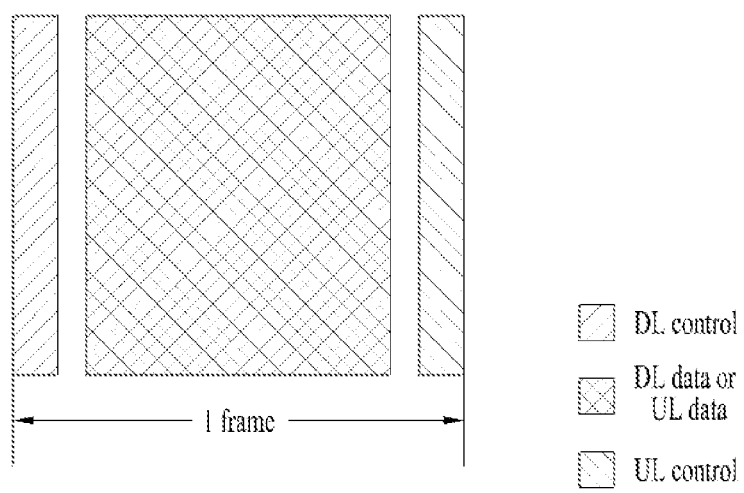

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Analog Beamforming and Beam Management

In the NR system, a massive MIMO environment where a number of Tx/Rx antennas are used may be considered. In the massive MIMO environment, there may be tens or hundreds of Tx/Rx antennas or more. In addition, the NR system supports communication in frequency bands above 6 GHz, i.e., communication in millimeter frequency bands. However, in the millimeter frequency band, signal attenuation may sharply increase depending on distance due to the use of such an extremely high frequency band. Thus, the NR system using bands at least above 6 GHz uses a beamforming scheme where a signal is transmitted in a specific direction based on energy collection rather than omni-directionally in order to compensate for such significant propagation attenuation.

In particular, if a number of antennas are required as in the millimeter frequency band, the use of analog beamforming or hybrid beamforming is considered. In the analog beamforming, multiple antenna elements are mapped to one transceiver unit (TXRU), and the direction of a beam is adjusted by an analog phase shifter.

To maximize the performance gain of the massive MIMO, each antenna element may have a TXRU such that the adjustment of transmit power and phases per antenna element is enabled. By doing so, independent beamforming may be performed per frequency resource. However, installing the TXRU in each antenna element is less feasible in practical terms.

Therefore, a method of mapping a plurality of antenna elements to one TXRU and adjusting the direction of a beam using an analog phase shifter has been considered in the NR system. In the case of an analog beam, there is a limitation that only one beam direction is capable of being formed for each time instance (e.g., symbol, subframe, etc.), and there is a disadvantage that the performance may be significantly degraded when Tx/Rx beam pairing is inaccurate.

Figure 15:
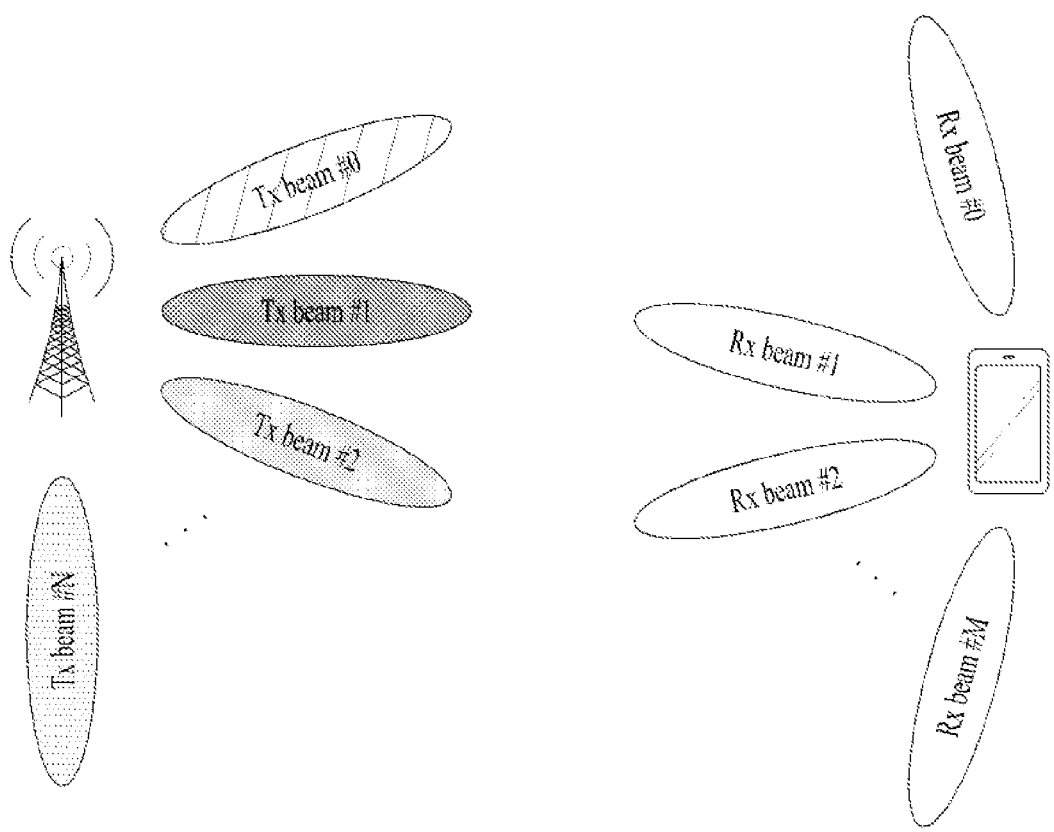
FIG. 15 is a diagram for explaining the configuration of a pair of transmission and reception beams between a user equipment (UE) and a base station (BS) according to an example or implementation of the present disclosure.

FIG. 15 is a diagram for explaining the configuration of a Tx/Rx beam pair between a UE and a BS (eNB or gNB). It is assumed that the BS configures N Tx (analog) beams and the UE configures M Rx (analog) beams. If the UE receives signals with beam pairs consisting of Tx beam #1 and Rx beam #1 and Tx beam #2 and Rx beam #2, the reception performance may be optimized. In this case, if the UE receives the signal transmitted on Tx beam #2 on other Rx beams except Rx beam #2, which is paired with Tx beam #2, the reception performance of the UE may be degraded.

In an example or implementation of the present disclosure, provided is a Tx/Rx beam pairing method for direct communication between UEs (or UEs belonging to a UE group) over sidelink. Although the proposed method is described based on a unicast scenario for convenience of description, the method may be applied to a multicast scenario in a similar way.

Transmission and/or Reception Beam Pairing for Vehicle Communication in Millimeter Wave (mmWave) Band Considering the use of an analog (or digital) beam for vehicle communication in mmWave bands, Tx/Rx beam pairing operation is required. Accordingly, a method of determining a Tx/Rx beam pair based on beam sweeping and beam sweeping results is needed For initial access, it may be considered that the Tx/Rx beam pairing operation is performed together with synchronization based on synchronization signals, for example, a synchronization signal block (SSB). Specifically, in the initial access, if a BS repeatedly transmits a synchronization signal (e.g., SSB) for each Tx beam, a UE receives and measures the repeated signal and searches for the best Rx beam.

Alternatively, a method of determining a Tx/Rx beam pair based on a channel measurement reference signal (e.g., CSI-RS) may be considered. The NR system currently supports this operation.

Alternatively, a method of determining a Tx/Rx beam pair based on control information or a channel carrying control information (e.g., PSCCH) may be considered. In this case, the control information may be divided into first and second control information and transmitted. Further, the beam pairing operation may be performed based on (i) the first control information or a channel carrying the first control information, (ii) the second control information or a channel carrying the second control information, or (iii) a combination of (i) and (ii).

Specifically, the first control information may be information broadcast in a cell, i.e., information decoded by all UEs that receives a message including the first control information, and the second information may be information decoded by a target receiving UE corresponding to one of UEs that receives a message (e.g., a UE having an ID corresponding to a destination ID included in the message). Alternatively, the second control information may be information unicast by a transmitting UE. Further, the first control information may be information transmitted over a PSCCH, and the second control information may be information piggybacked on the PSCCH and/or a PSSCH.

In the NR system, since the above-described processes are designed in consideration of a single BS or transmitter, all UEs in one cell commonly perform beam pairing based on only a synchronization signal transmitted by the single transmitter.

When UEs operate in V2X mode 4 where autonomous scheduling is considered as described above with reference to FIG. 8, both the transmitting and receiving UEs determine Tx/Rx frequency/time resources autonomously. If the transmitting UE selects a random Tx beam without any information about Rx beams of the receiving UE as in random selection, the quality of a received signal may be significantly degraded depending on which Rx beam the receiving UEs uses to receive the signal.

Thus, it is necessary for the transmitting and receiving UEs to exchange (or transfer) information about beam sweeping results to achieve efficient Tx/Rx beam pairing.

In this case, it is required not only to configure an appropriate Tx/RX beam pair between UEs but also to configure an appropriate transmission and reception timing between the UEs. The reason for this is as follows: when only one beam is capable of being formed at one time point due to the capability of the receiving UE, the Rx beam of the receiving UE may be towards a different direction due to a specific cause (for example, for reception of a high-priority signal transmitted from another UE or a signal for a service with ProSe per-packet priority (PPPP)) at the time when the transmitting UE transmits a signal. In this case, the quality of the received signal may be degraded, and as a result, beam sweeping may become pointless.

Thus, for D2D communication, not only the Tx/Rx beam pair but also available frequency/time resources need to be considered and selected in the Tx/Rx beam pairing process.

In addition to unicast over sidelink, a multicast and/or broadcast situation may also be considered. That is, the Tx/Rx beam pairing process may need to be designed by considering a case in which the Tx/Rx beam pair is based on a one-to-many or many-to-one relationship unlike the one-to-one relationship in the unicast case. This may be summarized as the following three cases.

(i) As a method of reducing time delay required in beam pairing, selecting a Tx/Rx beam pair and determining a time resource to be used for transmission and reception are performed during the Tx/Rx beam pairing process.

(ii) Based on beam sweeping results, the receiving UE reports to the transmitting UE information about K (e.g., K=1) preferred Rx beam(s) (e.g., beam index) and/or information about the time at which the receiving UE is capable of receiving a signal on the selected preferred Rx beam(s). The information reported by the receiving UE to the transmitting UE may include various information (e.g., a reference signal received power (RSRP) measured on the Tx/Rx beam) as well as the aforementioned two types of information. Details of the various information will be described later.

(iii) The transmitting UE selects the Tx/Rx beam pair and the transmission and reception timing based on the report from the receiving UE (i.e., information about the preferred Rx beam and information about the time available for the reception on the selected preferred Rx beam).

Figure 16:
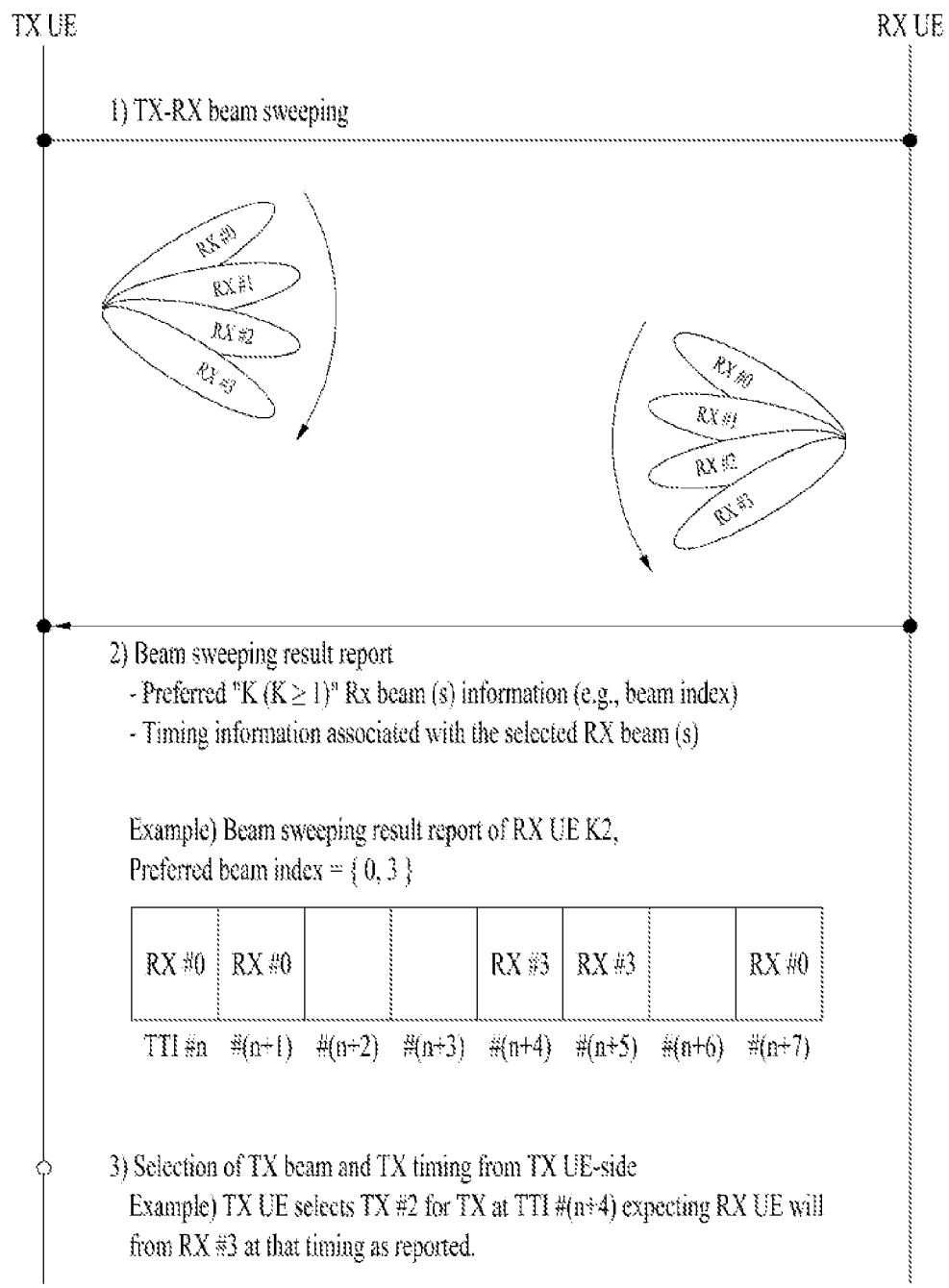
FIGS. 16 and 17 are diagrams for explaining a method for a UE to determine a transmission beam in a wireless communication system supporting sidelink according to an example or implementation of the present disclosure.

FIG. 16 illustrates an example or implementation of the present disclosure regarding (i) to (iii). Details will be described with reference to FIG. 16.

Step 1. Beam Sweeping

As the first step of beam pairing, the transmitting and receiving UEs perform Tx/Rx beam sweeping. FIG. 16 shows that the transmitting UE (Tx UE) and the receiving UE (Rx UE) perform Tx beam sweeping and Rx beam sweeping, respectively. However, a case in which either the Tx beam sweeping of the Tx UE or the Rx beam sweeping of the Rx UE is performed may also be included as an example or implementation of the present disclosure. According to an example or implementation of the present disclosure, when only the Rx beam sweeping is applied, the method may correspond to selecting, by the Tx UE, an Rx beam and a transmission timing. By performing the beam sweeping, each of the Tx and Rx UEs obtains measurements for the beam sweeping.

According to an example or implementation of the present disclosure, the above-described beam sweeping operation of the Tx and Rx UEs may not be mandatory. That is, the operation may be optional.

Step 2. Report of Beam Sweeping Results

The Rx UE may determine its preferred Rx beam(s) and also determine a time resource (e.g., reception timing) capable of receiving data on the corresponding beam(s) based on its beam sweeping results. Further, the Rx UE may provide the determination results to the Tx UE so that the Tx UE may use the determination results in determining a beam pair and a transmission and reception timing. In other words, the receiving UE may provide the Tx UE with information about its preferred Tx and/or Rx beam(s) and/or information about a timing capable of receiving a signal on the selected preferred Tx and/or Rx beam(s).

In this case, the information about the preferred Tx and/or Rx beam of the Rx UE may be represented as a beam index or an index related to the time at which the corresponding Rx beam was formed in the beam sweeping process. The beam index may be predetermined or signaled between the Tx and Rx UEs. The index related to the time at which the Rx beam was formed may be represented as, for example, index 5 if four beams had been formed before the corresponding Rx beam during the beam sweeping process.

The information about the timing available for signal reception on the preferred Tx and/or Rx beam, which is selected by the Rx UE, may be represented as a TTI index available for signal reception. In this case, the information about the timing available for signal reception on the selected preferred Tx and/or Rx beam, which is to be reported by the Rx UE to the Tx UE, may correspond to: (1) information about a reception timing in a time window where the beam sweeping results are valid (e.g., beam coherence time); or (2) information about an available reception timing within a period capable of satisfying the Quality of Service (QoS) (e.g., latency requirements) of data to be transmitted. The reason for why the time window or the QoS is considered is that if the Rx UE reports the beam sweeping results too late, the Tx UE may not use the received information efficiently.

According to an example or implementation of the present disclosure, when the Rx UE reports the information about the preferred Tx and/or Rx beam to the Tx UE, the Rx UE may report (i) a measurement on the corresponding Tx/Rx beam, for example, a reference signal received power (RSRP), a signal-to-noise ratio (SNR), etc. and/or (ii) information about the preference of the selected preferred Tx/Rx beam (e.g., priority information or ranking information) together with the information about the preferred Tx and/or Rx beam.

According to an example or implementation of the present disclosure, the Rx UE may be configured to monitor an Rx beam at a timing available for signal reception based on the information reported to the Tx UE.

Step 3. Determination of Transmission Beam and Transmission Timing by Transmitting UE The Tx UE determines a Tx beam and a transmission timing based on the information received from the Rx UE together with its beam sweeping results. For example, referring to FIG. 16, in Step 2, the Rx UE (i) reports Rx #0 and Rx #3 as its preferred Rx beams and (ii) reports TTI #n, TTI #(n+1), and TTI #(n+7) as the timings available for signal reception on Rx #0 and TTI #(n+4) and TTI #(n+5) as the timing available for signal reception on Rx #3. In Step 3, the Tx UE may determine its preferred Tx beam and transmission timing by assuming that the Rx UE will operate as described above in (i) and (ii).

The Tx UE may determine a Tx/Rx beam pair and a data transmission timing based on the following criterion (or criteria). To determine the Tx/Rx beam pair and data transmission timing, the following criteria may be used independently or in combination.

(i) RSRP, received signal strength indicator (RSSI), and/or reference signal received quality (RSRQ) for beam pairs (or for each beam pair), (ii) PPPP of packet to be transmitted, (iii) Channel busy ratio/channel occupancy ratio (CBR/CR), (iv) Time widow in which beam sweeping performed by Tx UE is valid, and/or (v) Latency requirements of packet to be transmitted by Tx UE Specifically, in Step 3, the Tx UE determines the Tx/Rx beam pair and the transmission timing on the premise that the Rx UE will operate as described in Step 2. Thus, it is highly expected that the Rx UE will form a beam and receive a signal in the direction of the Rx beam, which is reported in Step 2, at the transmission and reception timing, which is determined by the Tx UE in Step 3. However, in some cases, the Rx UE may be incapable of receiving the signal. For example, the Rx UE may form an Rx beam in a direction different from the determined one to receive an urgent message from another Tx UE or may be incapable of receiving any signals at the determined reception timing to transmit a high-priority message. In this case, a new rule may be defined to allow the Tx and Rx UEs to operate in a different way from the information reported by the Rx UE to the Tx UE (e.g., information on a Tx/Rx beam and information about a timing available for reception on the Tx/Rx beam).

Application to Multicast

Hereinabove, the operations of the Tx and Rx UEs have been described based on unicast communication. However, the present disclosure is not limited to the unicast communication. That is, the present disclosure is applicable to multicast communication in a similar way.

According to an example or implementation of the present disclosure, Steps 1 and 2 may be applied to the multicast communication in the same way as the unicast communication. However, the operations of the Tx UE described in Step 3 may need to be modified. That is, unlike the unicast communication, the Tx UE may receive reports from a plurality of Rx UEs in Step 2 in a multicast scenario. Thus, the Tx UE may determine Tx beams and signal transmission timings for multicast transmission based on "its beam sweeping measurement results and/or the report results from the plurality of Rx UEs (Step 2)".

In determining a Tx beam for the multicast communication, the Tx UE may determine the direction of the Tx beam (e.g., beam index) and the beam width thereof. For example, after receiving the reports from the plurality of Rx UEs in Step 2, the Tx UE may determine a common reception timing for the Rx UEs. However, when it is difficult for the Tx UE to determine a specific Tx beam direction for each Rx UE at the corresponding timing, the Tx UE may form a broad beam capable of covering the plurality of Rx UEs, that is, determine the Tx beam direction and the beam width such that similar beam directions are covered.

In determining a signal transmission timing for the multicast transmission, the Tx UE may group Rx UEs to which the Tx UE is capable of transmitting signals by forming similar Tx beam directions based on the report results in Step 2 and then determine time division multiplexing (TDM) based transmission for each group. In other words, the Tx UE may transmit signals for a plurality of groups obtained by grouping on different transmission time resources. For example, when the Tx beam direction for some Rx UEs are completely different from that of the remaining Rx UEs, the Tx UE may be configured to divide multicast Rx UEs into two groups and transmit a signal to each group at a different timing by forming a different beam direction/width.

In the present specification, the proposed methods are described based on V2V scenarios. However, the methods are not limited thereto, and they are applicable to network-to-UE communication. The aforementioned methods may be implemented independently, but some methods may be combined (or merged) for implementation.

Extension of Beam Index Information

The preferred beam index fed back (or reported) by the Rx UE to the Tx UE in Step 2 of FIG. 16 may be at least one of the following indices or information.

(i) Information about (absolute or relative) order indicating how many beams are measured before a corresponding beam among beams to which the Rx UE applies beam sweeping (ii) Information indicating the order of a corresponding Tx/Rx beam pair in a beam sweeping pattern when the beam sweeping pattern is predetermined between the Tx and Rx UEs (for example, when combinations of (Tx beam #, Rx beam #) are determined as a pattern)

(iii) The Tx beam (and/or beam group) index associated with the preferred Rx beam index selected by the Rx UE (iv) The Tx beam index of the Tx UE when the Rx UE knows the absolute beam indices of the Tx UE used for beam sweeping (v) The Rx beam index of the Rx UE (vi) The index associated with a resource for transmitting an RS configured for beam measurement for beam sweeping (e.g., CSI-RS resource index, CRI, etc.)

In particular, when the Tx and Rx UEs exchange the absolute beam index of the Tx or Rx beam as described in (iv) or (v), the absolute beam index may be determined according to a predetermined rule.

Specifically, the rule may be predetermined or signaled in consideration of (i) a specific (or entire) region, (ii) a resource pool, (iii) a service type, (iv) an absolute direction (e.g., cardinal points), (v) a vehicle moving direction, and/or (vi) a road direction. The order and/or direction of determining beam indices between a vehicle and a UE (for example, the clockwise direction) may be predetermined.

For example, when it is predetermined that all UEs set the index of a beam heading north to beam index 0, the UEs may perform mapping between absolute beam indices and beams that the UEs can form by increasing beam indices through clockwise rotation by a predetermined angle (e.g., three degrees) with respect to beam index 0.

Beam Sweeping Performed by Only Receiving UE

The present disclosure has been described on the assumption that both the Tx and Rx UEs search for Tx/Rx beam pairs based on beam sweeping. However, even when only the Rx UE performs beam sweeping to select the best Rx beam, the present disclosure may be applied in a similar way. Specifically, a description will be given of a case in which the Tx UE does not need to perform beam sweeping based on the following assumptions: (i) the Tx beam of the Tx UE has a specific direction and a specific beam width according to a specific condition or (ii) only one type of beam direction and/or beam width can be formed in terms of UE implementation. Assumption (i) or (ii) may be applied when the Tx UE forms a beam with a relatively wide beam width (or an omni-directional beam) and performs broadcast or multicast transmission to a plurality of UEs corresponding to service targets (or data transmission targets) which are located in an area covered by the corresponding beam. According to an example or implementation of the present disclosure, the Rx UE(s) may determine the best Rx beam direction through beam sweeping and feed information about a timing at which the corresponding beam direction is capable of being set to the Rx beam direction back to the Tx UE.

Figure 17:
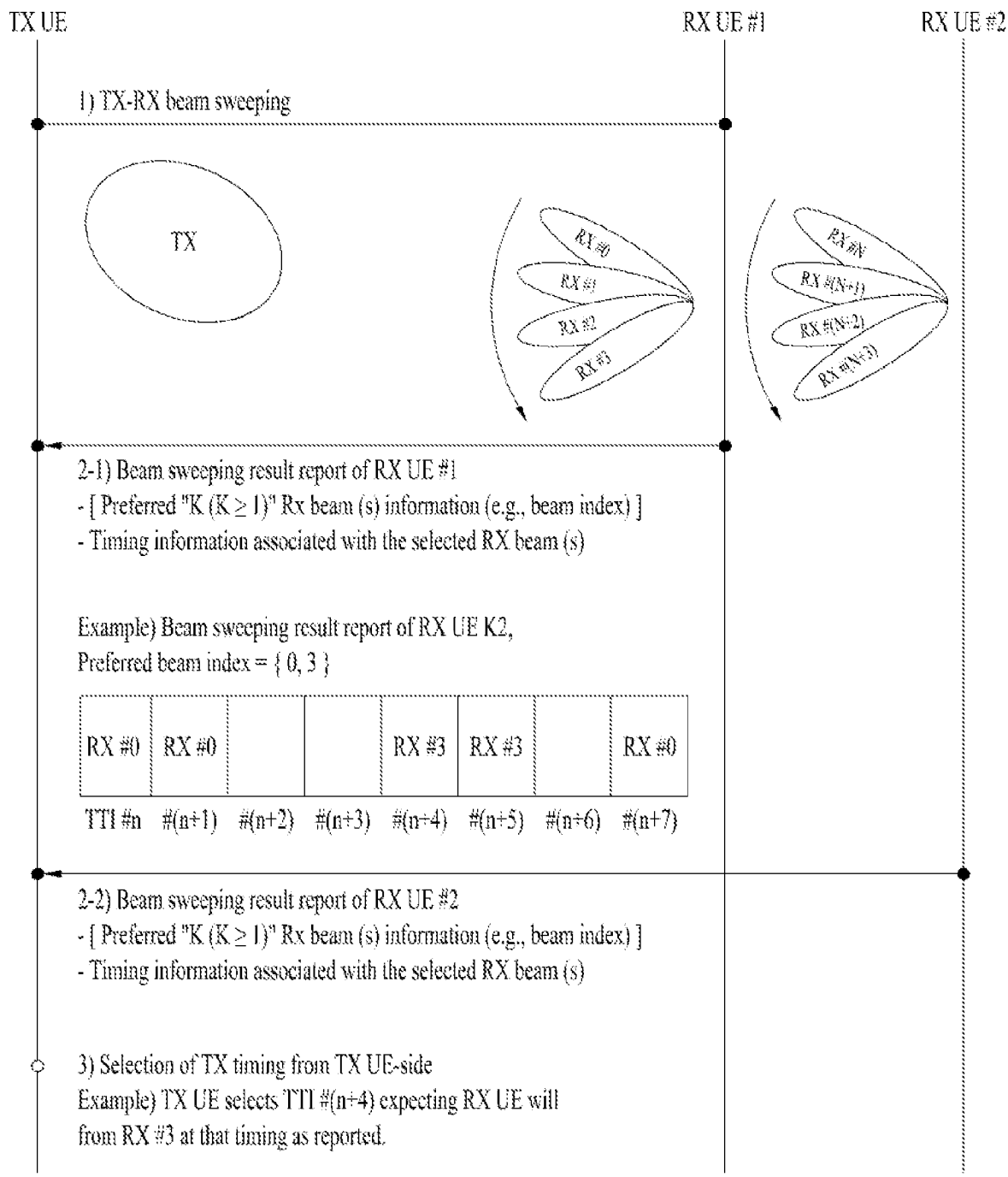

For example, as shown in FIG. 17, Rx UE #1 may determine beams #0 and #3 as its preferred Rx beams and feed information about transmission and reception timings (e.g., TTI #N) at which Rx UE #1 sets the corresponding beams as its RX beams back to the Tx UE. In addition, Rx UE #2 may perform the same operation. The Tx UE may select an overlapping transmission and reception timing among the transmission and reception timings at which the Rx UEs are capable of performing reception, which are fed back by Rx UEs #1 and #2, and transmit data on a Tx beam formed/selected by the Tx UE.

Figure 18:
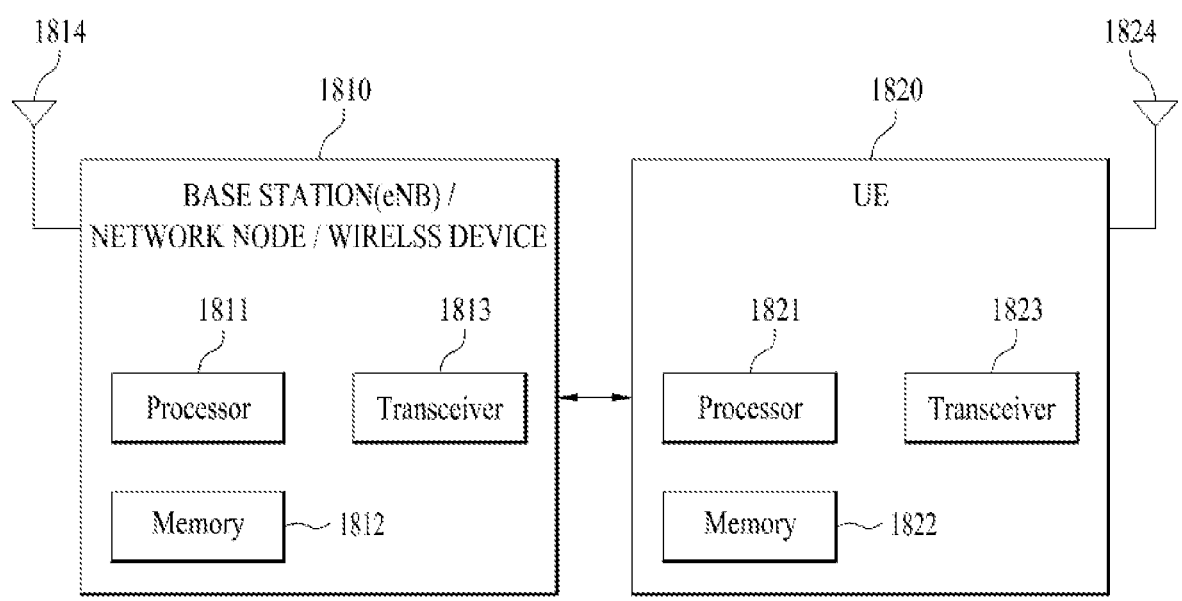
FIG. 18 is a block diagram of wireless communication devices according to an example or implementation of the present disclosure.

FIG. 18 is a block diagram of wireless communication devices according to an example or implementation of the present disclosure.

Referring to FIG. 18, a wireless communication system may include a BS 1810 and a UE 1820. The UE 1820 may be located in the coverage of the BS 1810. In some examples or implementations, the wireless communication system may include a plurality of UEs. Although FIG. 18 shows the BS 1810 and the UE 1820, the present disclosure is not limited thereto. For example, the BS 1810 may be replaced with a network node, a UE, a radio device, etc. Alternatively, each of the BS and UE may be substituted with a radio device or a radio communication device.

The UE 1820 may include at least one processor 1821, at least one memory 1822, and at least one transceiver 1823. The processor 1811 may be configured to process the details required for each example or implementation so as to implement the functions, procedures, or methods described above in each example or implementation. In addition, the processor 1821 may implement one or more protocols. For example, the processor 1821 may implement one or more radio interface protocol layers (e.g., functional layers). The memory 1822 may be connected to the processor 1821 and configured to store various types of information and/or instructions. The transceiver 1823 may be electrically connected to the processor 1821 and configured to transmit and receive radio signals under the control of the processor 1821.

Specifically, the processor 1821 of a first UE for determining a Tx beam in a wireless communication system supporting sidelink may be configured to control the transceiver 1823 to receive beam-related information from a second UE and determine a Tx beam for the second UE based on the beam-related information. In particular, the beam-related information may include a beam index and a time resource index for the beam index.

The processor 1821 may be configured to determine the Tx beam and a transmission time resource based on the beam index and the time resource index.

The beam index may be the beam index of a reception beam of the second UE.

The processor 1821 may be configured to control the transceiver 1823 to transmit an RS on each of a plurality of RS resources and control the transceiver 1823 to receive the beam-related information from the second UE in response to the transmission of the reference signal. In particular, the beam index may indicate one of the plurality of RS resources.

The time resource index may be included within a predetermined valid time period.

The beam-related information may further include a reference signal received power (RSRP) or a signal-to-noise ratio (SNR) measured by the second UE based on the reception beam with the beam index.

The processor 1821 may be configured to control the transceiver 1823 to receive the beam-related information from the second UE in response to beam sweeping performed by the first UE.

The processor 1821 may be configured to control the transceiver 1823 to receive beam-related information from each of a plurality of second UEs and determine the direction, width, and transmission time resource of a Tx beam for each of the plurality of second UEs.

The processor 1821 may be configured to group the plurality of second UEs into a plurality of groups based on the beam-related information received from each of the plurality of second UEs. In particular, the processor 1821 may be configured to control the transceiver 1823 to transmit signals for the plurality of groups on different transmission time resources.

According to an example or implementation of the present disclosure, a Tx/Rx beam pair and timing may be adjusted by efficient signaling between Tx and Rx UEs, thereby improving communication quality and reducing communication delay.

The BS 1810 may include at least one processor 1811, at least one memory 1812, and at least one transceiver 1813. The processor 1811 may be configured to process the details required for each example or implementation so as to implement the functions, procedures, or methods described above in each example or implementation.

In addition, the processor 1811 may implement one or more protocols. For example, the processor 1811 may implement one or more radio interface protocol layers (e.g., functional layers). The memory 1812 may be connected to the processor 1811 and configured to store various types of information and/or instructions. The transceiver 1813 may be electrically connected to the processor 1811 and configured to transmit and receive radio signals under the control of the processor 1811.

The memory 1812 and/or 1822 may be located inside or outside the processor 1811 and/or 1821 and connected to the processor 2211 and/or 2221 in various ways such as wireless or wired connections.

Specifically, the processor 1811 and/or the memory 1812 may be located according to an appropriate random physical arrangement. In an example or implementation of the present disclosure, the processor 1811 and/or the memory 1812 may be implemented on the same board, the same package (e.g., system-in-package), and/or the same chip (e.g., system-on-chip). In an example or implementation of the present disclosure, the processor 1811 and/or the memory 1812 may include distributed, virtualized, and/or containerized computing resources. In accordance with this example or implementation, the process 1811 and/or the memory 1812 may be located in at least one data center and/or cloud computing equipment.

In an example or implementation of the present disclosure, the memory 1812 may include non-transitory tangible machine readable media containing executable code for enabling a computing device to perform the methods described herein alone or in association with other computing devices in the vicinity thereof. The BS 1810 and/or the UE 1820 may include a single or multiple antennas. For example, an antenna 1814 and/or 1824 may be configured to transmit and receive a radio signal.

Figure 19:
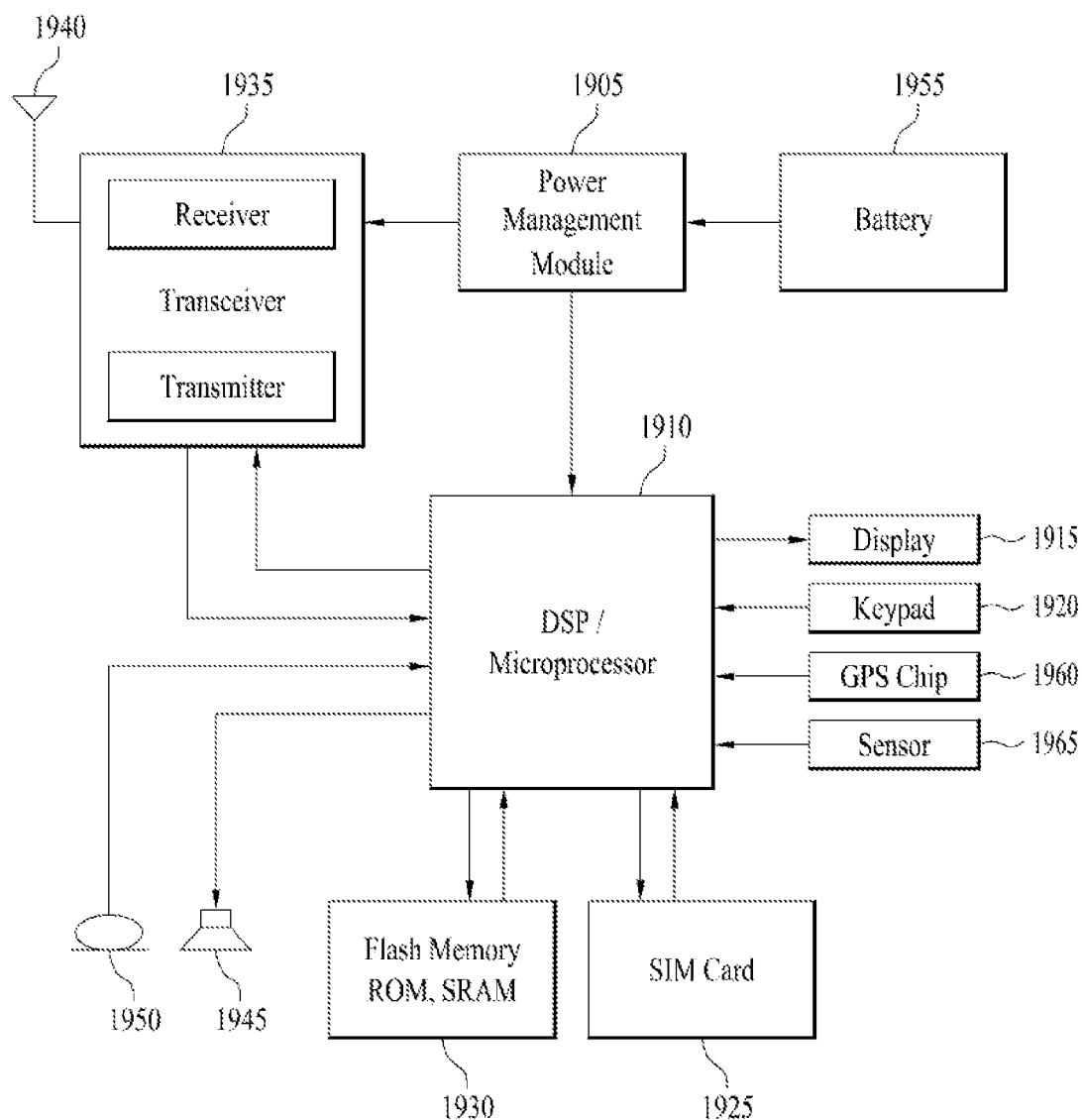
FIG. 19 is a diagram schematically illustrating a wireless communication device according to an example or implementation of the present disclosure.

FIG. 19 is a diagram schematically illustrating a wireless communication device according to an example or implementation of the present disclosure.

Particularly, FIG. 19 illustrates, as an example, the UE 1820 shown in FIG. 18 in detail. However, the wireless communication device of FIG. 19 is not limited to the UE 1820, and the wireless communication device may be any mobile computing device configured to be suitable for implementing at least one of the above-described embodiments. For example, such a mobile computing device may include a vehicle communication system and/or device, a wearable device, a laptop, a smartphone, etc.

Referring to FIG. 19, the UE 1820 may include at least one of the following components: a processor 1910 including a digital signal processor (DSP) or a microprocessor, a transceiver 1935, a power management module 1905, an antenna 1940, a battery 1955, a display 1915, a keypad 1920, a global positioning system (GPS) chip 1960, a sensor 1965, a memory 1930, a subscriber identification module (SIM) card 1925, a speaker 1945, and a microphone 1950. The UE 1820 may include a single antenna or multiple antennas.

The processor 1910 may be configured to process the details of the embodiments to implement the functions, procedures, or methods described above in the embodiments. In some embodiments, the processor 1910 may implement one or more protocols such as radio interface protocol layers (e.g., functional layers).

The memory 1930 may be connected to the processor 1910 and configured to store information related to operations of the processor 1910. The memory 1930 may be located inside or outside the processor 1910 and connected to the processor 1910 in various ways such as wireless or wired connections.

A user may enter various types of information (e.g., instruction information such as a phone number) in various ways, for example, by pushing the buttons on the keypad 1920 or by voice recognition through the microphone 1950. The processor 1910 may receive and process the information from the user and then perform an appropriate function such as dialing the phone number. In some embodiments, data (e.g., operational data) may be retrieved from the SIM card 1925 or the memory 1930 to perform specific function(s). In some embodiments, the processor 1910 may receive and process GPS information from the GPS chip 1960 and then perform functions related to the position or location of the UE (e.g., vehicle navigation, map services, etc.). In some embodiments, the processor 1910 may display various types of information and data on the display 1915 for the user's reference and convenience.

The transceiver 1935 may be connected to the processor 1910 and configured to transmit and/or receive a radio signal such as a radio frequency (RF) signal. The processor 1910 may control the transceiver 1935 to initiate communication and transmit radio signals including various types of information or data, for example, voice communication data. The transceiver 1935 includes a receiver configured to receive a radio signal and a transmitter configured to transmit a radio signal. The antenna 1940 is a device for performing radio signal transmission and reception. In some embodiments, upon receiving radio signals, the transceiver 1935 may forward and convert the signals to baseband frequency for processing by the processor 1910. The processed signals may be converted into audible or readable information based on various techniques, and the audible or readable information may be output through the speaker 1945 or the display 1915.

In some embodiments, the sensor 1965 may be connected to the processor 1910. The sensor 1965 may include one or more sensing devices configured to detect various types of information such as a speed, acceleration, light, vibration, proximity, location, image, etc. The processor 1910 may receive and process sensor information obtained from the sensor 1965 and perform various types of functions such as collision avoidance, autonomous driving, etc.

Figure 22:
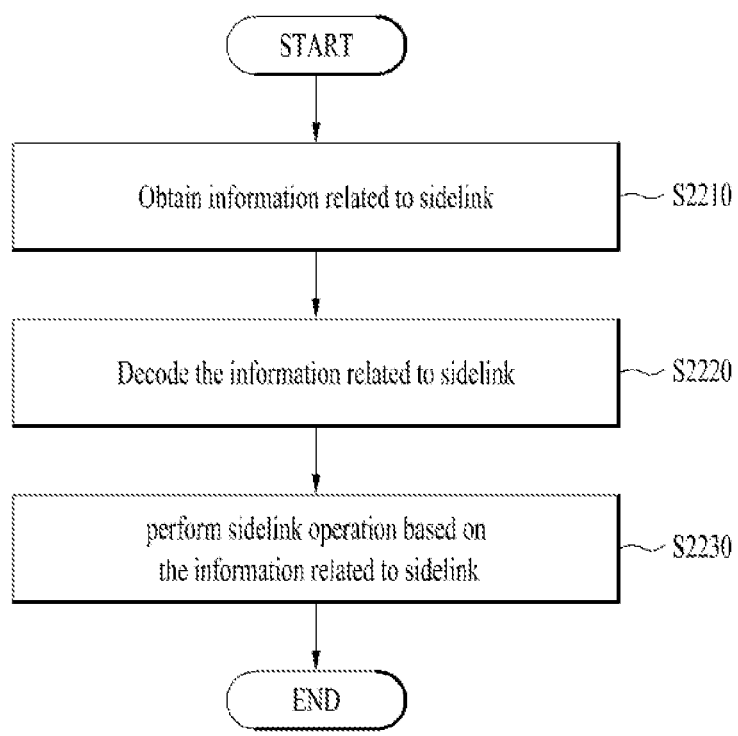
FIG. 22 is a flowchart for explaining sidelink-related operations of a wireless device according to an example or implementation of the present disclosure.

As shown in FIG. 22, the UE may further include various components (e.g., a camera, a universal serial bus (USB) port, etc.). For example, a camera may be further connected to the processor 1910 and used for various services such as autonomous driving, vehicle safety services, etc. That is, FIG. 22 shows one example of the UE, and thus, the scope of the present disclosure is not limited to the configuration illustrated in FIG. 22. For example, some of the following components: the keypad 1920, the GPS chip 1960, the sensor 1965, the speaker 1945, and the microphone 1950 may not be included or implemented in the UE.

Figure 20:
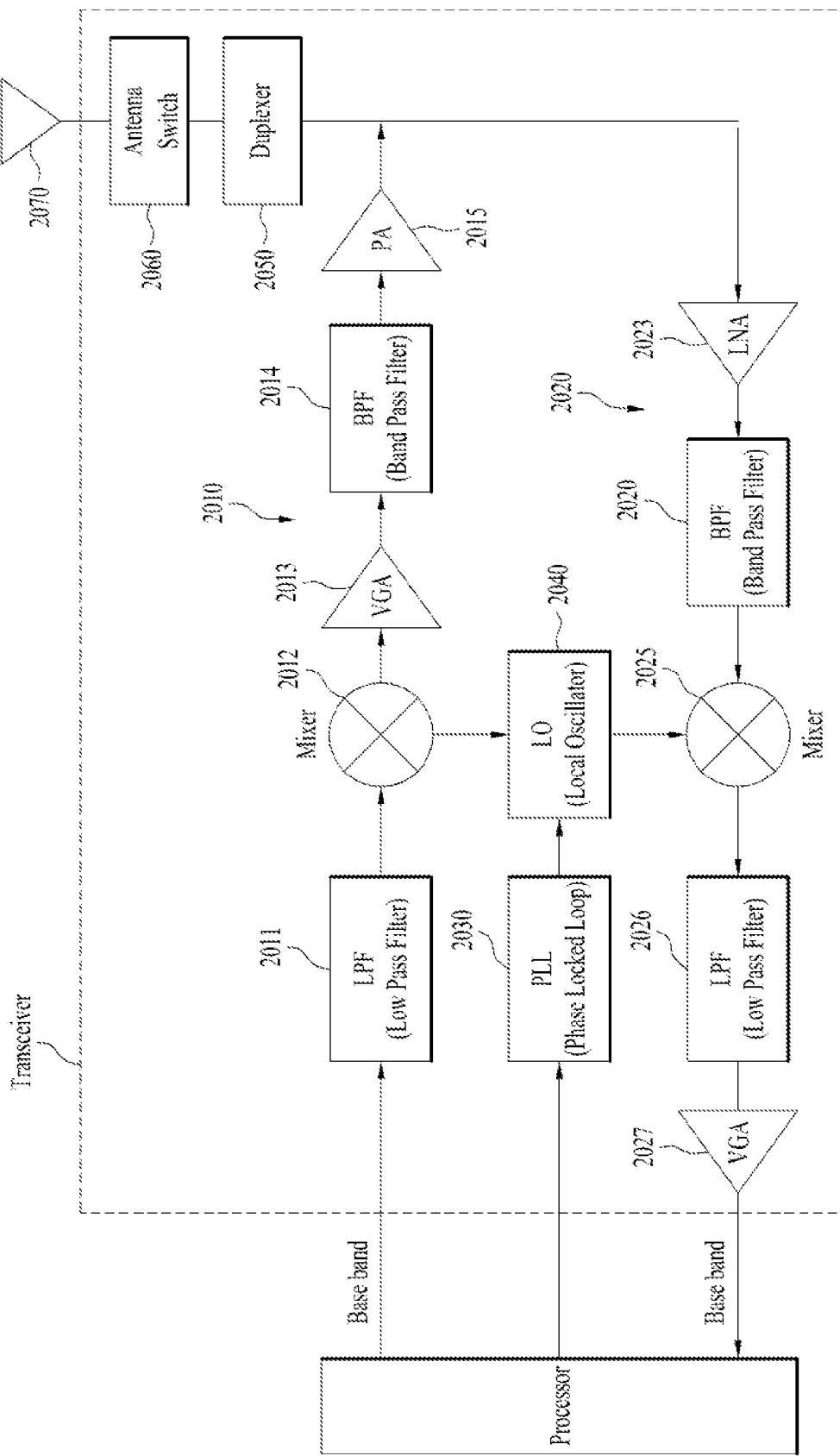
FIG. 20 is a block diagram schematically illustrating a transceiver of a wireless communication device according to an example or implementation of the present disclosure.

FIG. 20 is a block diagram schematically illustrating a transceiver of a wireless communication device according to an example or implementation of the present disclosure.

Specifically, FIG. 20 shows an example of a transceiver capable of operating in an FDD system.

In the transmit path, at least one processor including the processors described in FIGS. 18 and 19 may be configured to process data to be transmitted and provide a signal such as an analog output signal to a transmitter 2010.

Figure 21:
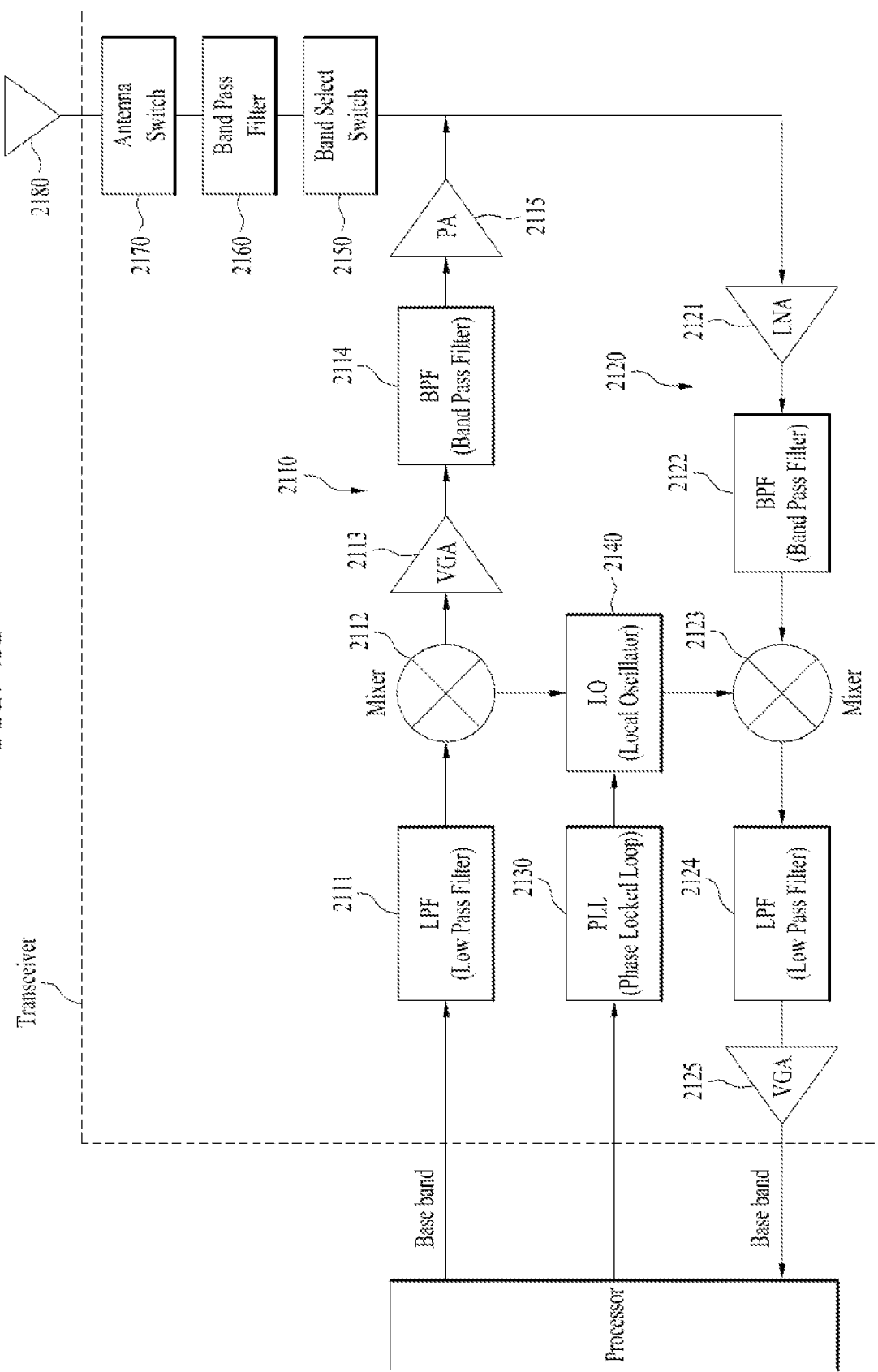
FIG. 21 is a block diagram schematically illustrating another example of a transceiver of a wireless communication device according to an example or implementation of the present disclosure.

In the transmit path, at least one processor including the processors described in FIGS. 21 and 22 may be configured to process data to be transmitted and provide a signal such as an analog output signal to a transmitter 2010. At the transmitter 2010, the analog output signal may be filtered by a low pass filter (LPF) 2011 (to remove artifacts caused by conventional analog-to-digital conversion (ADC)), up-converted from baseband to RF by an up-converter (e.g., mixer) 2012, and amplified a variable gain amplifier (VGA) 2013. The amplified signal may be filtered by a filter 2014, further amplified by a power amplifier (PA) 2015, routed through a duplexer 2050 and/or an antenna switch 2060, and transmitted on an antenna 2070.

In the receive path, the antenna 2070 may receive a signal from a wireless environment. The receive signal may be routed through the antenna switch 2060 and the duplexer 2050 and then provided to a receiver 2020.

At the receiver 2020, the received signal may be amplified by an amplifier such as a low noise amplifier (LNA) 2023, filtered by a band pass filter 2024, and down-converted from RF to baseband by a downconverter (e.g., mixer) 2025.

The down-converted signal may be filtered by an LPF 2026 and amplified by an amplifier such as a VGA 2027 to obtain an analog input signal. Then, the analog input signal may be provided to the processors in FIGS. 18 and 19.

Further, a local oscillator (LO) generator 2040 may generate and provide transmission and reception LO signals to the up-converter 2012 and the down-converter 2025, respectively.

The present disclosure is not limited to the configuration shown in FIG. 20, and various components and circuits may be arranged differently from the example shown in FIG. 20 to achieve the functions and effects according to the present disclosure.

FIG. 21 illustrates another example of a transceiver of a wireless communication device according to an example or implementation of the present disclosure.

Specifically, FIG. 21 shows an example of a transceiver capable of operating in a TDD system.

In some embodiments, a transmitter 2110 and a receiver 2120 included in the transceiver of the TDD system may have one or more features similar to those of the transmitter and the receiver included in the transceiver of the FDD system. Hereinafter, the structure of the transceiver of the TDD system will be described.

In the transmit path, a signal amplified by a power amplifier (PA) 2115 in the transmitter is routed through a band select switch 2150, a BPF 2160, and an antenna switch 2170 and transmitted on an antenna 2180.

In the receive path, the antenna 2180 may receive a signal from a wireless environment. The receive signal may be routed through the antenna switch(es) 2170, BPF 2160, and band select switch 2150 and provided to the receiver 2120.

FIG. 22 is a flowchart for explaining sidelink-related operations of a wireless device according to an example or implementation of the present disclosure.

Referring to FIG. 22, the wireless device may obtain information related to sidelink (S2210). The information related to the sidelink may include at least one resource configuration. The information related to the sidelink may be obtained from another wireless device or a network node.

After obtaining the information, the wireless device may decode the information related to the sidelink (S2220).

After decoding the information related to the sidelink, the wireless device may perform one or more sidelink operations based on the information related to the sidelink (S2230). Herein, the sidelink operation(s) performed by the wireless device may correspond to the one or more operations described in the flowchart.

The sidelink operations of the wireless device illustrated in FIG. 22 is merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, sidelink operation may mean information transmission/reception between UEs.

Figure 23:
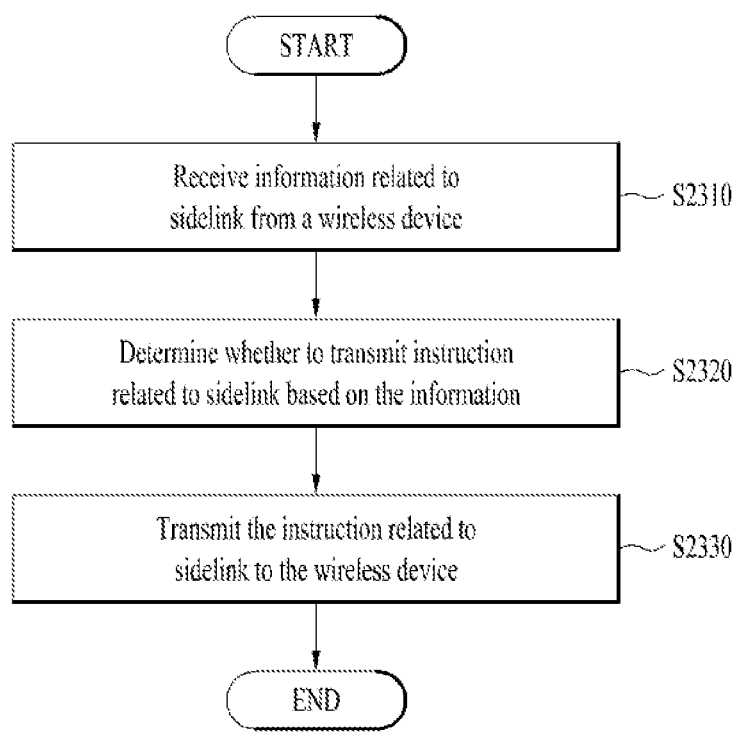
FIG. 23 is a flowchart for explaining sidelink-related operations of a network node according to an example or implementation of the present disclosure.

FIG. 23 is a flowchart for explaining sidelink-related operations of a network node according to an example or implementation of the present disclosure.

The sidelink operations of the network node illustrated in FIG. 23 is merely exemplary, and the network node may perform sidelink operations based on various techniques.

The network node may receive information related to sidelink from a wireless device (S2310). For example, the information related to the sidelink may be 'SidelinkUEInformation' which is used to indicate sidelink information to a network node.

After receiving the information, the network node may determine whether to transmit one or more instructions related to the sidelink based on the received information (S2320).

When determining to transmit the instruction(s), the network node may transmit the sidelink-related instruction(s) to the wireless device (S2330). In some embodiments, after receiving the instruction(s) transmitted from the network node, the wireless device may perform one or more sidelink operations based on the received instruction(s).

Figure 24:
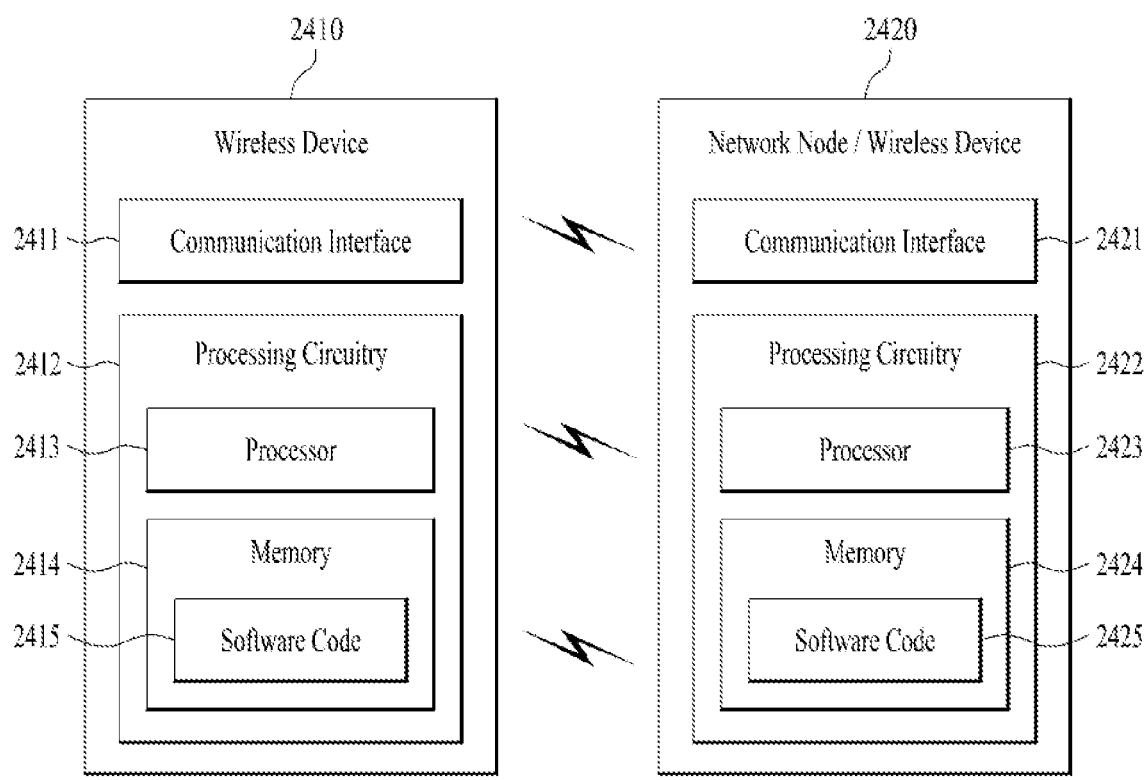
FIG. 24 is a block diagram schematically illustrating the configurations of a wireless device and a network node.

FIG. 24 is a block diagram schematically illustrating the configurations of a wireless device and a network node. A network node 2420 may be replaced with the wireless device or UE shown in FIG. 19.

For example, a wireless device 2410 may include a communication interface 2411 for communicating with one or more other wireless devices, network nodes, and/or other entities in the network. The communication interface 2411 may include one or more transmitters, one or more receivers, and/or one or more communications interfaces. The wireless device 2410 may include a processing circuitry 2412. The processing circuitry 2412 may include at least one processor such as a processor 2413 and at least one memory device such as a memory 2414.

The processing circuitry 2412 may be configured to control at least one of the above-described methods and/or processes and enable the wireless device 2410 to perform the methods and/or processes. The processor 2413 may correspond to one or more processors for performing the wireless device functions described herein. The wireless device 2410 may include a memory 2414 configured to store data, programmable software code, and/or other information described herein.

In some embodiments, the memory 2414 may be configured to store software code 2415 including instructions that allow at least one processor to perform some or all of the processes described above with reference to FIG. 22 or the methods described above in the embodiments.

For example, at least one process for transmitting and receiving information may be performed by the processor 2413 controlling the transceiver 1823 in FIG. 18 to transmit and receive the information.

The network node 2420 may include a communication interface 2421 for communicating with one or more other network nodes, wireless devices, and/or other entities in the network. The communication interface 2421 may include one or more transmitters, one or more receivers, and/or one or more communications interfaces. The network node 2420 may include a processing circuitry 2422. The processing circuitry 2422 may include a processor 2423 and a memory 2424.

For example, at least one process for transmitting and receiving information may be performed by the processor 2423 controlling the transceiver 1813 in FIG. 18 to transmit and receive the information.

The above-described embodiments of the present disclosure may be implemented through various means, for example, hardware, firmware, software, or a combination thereof.

In a hardware configuration, the methods according to the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. Software code may be stored in a memory unit and executed by a processor. The memory unit may be located inside or outside the processor and exchange data with the processor via various known means.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The method of detecting downlink control information and terminal therefor have been described based on the 3GPP LTE system, the method and terminal are applicable to various wireless communication systems as well as the 3GPP LTE system.

The invention claimed is:

1. A method of determining a transmission beam by a first user equipment (UE) in a wireless communication system supporting sidelink, the method comprising:
selecting, by the first UE, a synchronization reference source;
receiving, by the first UE from the synchronization reference source, a SSB (Synchronization Signal Block) including a primary synchronization signal and a secondary synchronization signal;
receiving, by the first UE from the synchronization reference source, a plurality of SSBs each of which is repeated transmission of the SSB;
synchronizing to the synchronization reference source based on the SSB and the plurality of SSBs;
receiving, by the first UE from a second UE, a first sidelink signal;
determining a transmission resource for a second sidelink signal;
transmitting, by the first UE to the second UE, the second sidelink signal via the transmission resource,
receiving information on resources for the sidelink;
receiving measurement information related to a state of a channel for each for a plurality of antenna units;
transmitting channel state information reference signal (CSI-RS) based on the measurement information;
performing beam sweeping based on the plurality of antenna units for transmission to obtain measurement;
obtaining measurements for the beam sweeping;
receiving beam-related information from a second UE; and
determining the transmission beam and a transmission timing for the second sidelink signal based on the beam-related information included in the first sidelink signal and the measurements for the beam sweeping,
wherein the beam-related information comprises one or more preferred reception beams of the second UE and a reception timing of the second UE,
wherein the reception timing of the second UE includes a time resource corresponding to each of the one or more preferred reception beams among the resources,
wherein the one or more preferred reception beams are determined based on beam sweeping of the second UE, and
wherein the one or more preferred reception beams are indicated in an index form in which each index informs which beams, among reception sweeping beams by the second UE, belong to the one or more reception beams preferred by the second UE.

2. The method of claim 1, further comprising:
transmitting a reference signal on each of a plurality of reference signal resources,
wherein the beam-related information is received from the second UE in response to the transmission of the reference signal, and
wherein the index form indicates one of the plurality of reference signal resources.

3. The method of claim 1, wherein a time resource index is included within a predetermined valid time period.

4. The method of claim 1, wherein the beam-related information further comprises a reference signal received power (RSRP) or a signal-to-noise ratio (SNR) measured by the second UE based on a reception beam with a beam index.

5. The method of claim 1, wherein the beam-related information is received from the second UE in response to the beam sweeping of the first UE.

6. The method of claim 1, wherein the reception of the beam-related information from the second UE comprises receiving the beam-related information from each of a plurality of second UEs, and wherein the determination of the transmission beam comprises determining a direction, a width, and a transmission time resource of a transmission beam for each of the plurality of second UEs.

7. The method of claim 6, further comprising grouping the plurality of second UEs into a plurality of groups based on the beam-related information received from each of the plurality of second UEs, wherein signals for the plurality of groups are transmitted on different transmission time resources.

8. A first user equipment (UE) for determining a transmission beam in a wireless communication system supporting sidelink, the first UE comprising:
a transceiver; and
a processor connected to the transceiver,
wherein the processor is configured to:
control the transceiver to select a synchronization reference source, receive a SSB (Synchronization Signal Block) including a primary synchronization signal and a secondary synchronization signal from the synchronization reference source, receive a plurality of SSBs each of which is repeated transmission of the SSB from the synchronization reference source, synchronize to the synchronization reference source based on the SSB and the plurality of SSBs, receive a first sidelink signal from a second UE, determine a transmission resource for a second sidelink signal, transmit the second sidelink signal via the transmission resource to the second UE, receive information on resources for the sidelink, receive measurement information related to a state of a channel for each for a plurality of antenna units, and transmit channel state information reference signal (CSI-RS) based on the measurement information;
perform beam sweeping based on the plurality of antenna units for transmission to obtain measurement;
obtain measurements for the beam sweeping;
control the transceiver to receive beam-related information from a second UE; and
determine the transmission beam and a transmission timing for the second sidelink signal based on the beam-related information included in the first sidelink signal and the measurements for the beam sweeping,
wherein the beam-related information comprises one or more preferred reception beams of the second UE and a reception timing of the second UE,
wherein the reception timing of the second UE includes a time resource corresponding to each of the one or more preferred reception beams among the resource,
wherein the one or more preferred reception beams are determined based on beam sweeping of the second UE, and
wherein the one or more preferred reception beams are indicated in an index form in which each index informs which beams, among reception sweeping beams by the second UE, belong to the one or more reception beams preferred by the second UE.

9. The first UE of claim 8, wherein the processor is configured to:
control the transceiver to transmit a reference signal on each of a plurality of reference signal resources; and
control the transceiver to receive the beam-related information from the second UE in response to the transmission of the reference signal, and
wherein the index form indicates one of the plurality of reference signal resources.

10. The first UE of claim 8, wherein a time resource index is included within a predetermined valid time period.

11. The first UE of claim 8, wherein the beam-related information further comprises a reference signal received power (RSRP) or a signal-to-noise ratio (SNR) measured by the second UE based on a reception beam with a beam index.

12. The first UE of claim 8, wherein the processor is configured to control the transceiver to receive the beam-related information from the second UE in response to the beam sweeping performed by the first UE.

13. The first UE of claim 8, wherein the processor is configured to:
control the transceiver to receive the beam-related information from each of a plurality of second UEs; and
determine a direction, a width, and a transmission time resource of a transmission beam for each of the plurality of second UEs.

14. The first UE of claim 13, wherein the processor is configured to:
group the plurality of second UEs into a plurality of groups based on the beam-related information received from each of the plurality of second UEs; and
control the transceiver to transmit signals for the plurality of groups on different transmission time resources.

* * * * *